United States Patent [19]
Hartley

[11] 3,724,495
[45] Apr. 3, 1973

[54] APPARATUS FOR CLEAN SEALING VALVES

[75] Inventor: Jack G. Hartley, Kelso Valley, Calif.

[73] Assignee: The United States Of Amercia as represent by the Secretary Of Air Force

[22] Filed: Feb. 11, 1971

[21] Appl. No.: 114,443

[52] U.S. Cl.................................................137/547
[51] Int. Cl.................................................F16k 1/00
[58] Field of Search.....................137/547, 614.2

[56] References Cited

UNITED STATES PATENTS

| | | | |
|---|---|---|---|
| 1,567,612 | 12/1925 | Pascale | 137/614.2 X |
| 2,912,003 | 11/1959 | Lagerwey | 137/547 |

Primary Examiner—Henry T. Klinksiek
Attorney—Harry A. Herbert, Jr. and Arsen Tashjian

[57] ABSTRACT

A filter assembly for preventing the entrapment of fluid-entrained particles between metal-to-metal sealing elements of a poppet-type valve assembly at the instant of closure. The filter assembly includes a cylinder-shaped filter holder which is perforated and which surrounds the periphery of the valve head, (i.e. poppet), a filter attached to the filter holder, and a bellows for attaching the filter holder, with the filter attached thereto, to the valve head. The filter assembly is so positioned and is so dimensioned that, when the valve is in the open position, there is unrestricted fluid flow and, at the instant immediately prior to valve closure, there is clean, filtered fluid flow. As a result, at closure there are no particles which can become entrapped between the metal-to-metal sealing elements, and the valve seals cleanly.

1 Claim, 3 Drawing Figures

PATENTED APR 3 1973 3,724,495

INVENTOR.
JACK G. HARTLEY
BY Harry A. Herbert Jr.
Arsen Tashjian
ATTORNEYS

APPARATUS FOR CLEAN SEALING VALVES

BACKGROUND OF THE INVENTION

This invention relates to an apparatus for clean sealing valves and, more particularly, to a filter assembly for use with a poppet-type valve assembly.

Some valve assemblies, such as those used in supplying corrosive propellants to certain rocket engines, are most reliable and less susceptible to degradation if they are of all metal construction, including the dynamic sealing surfaces. In such a flow system, particle entrapment between the metal-to-metal sealing surfaces cannot be tolerated, since such entrapment causes valve leakage with resulting deliterious effects.

Therefore, there is and there has been a critical need for an apparatus for permitting the clean sealing of valves when the sealing or closing surfaces are metal-to-metal and when there are particles entrained in the fluid which is flowing within the system.

I have invented such an apparatus and thereby have significantly advanced the state-of-the-art.

SUMMARY OF THE INVENTION

This invention pertains to a filter assembly for preventing the entrapment of fluid-entrained particles between the metal-to-metal sealing elements of a poppet-type valve assembly at the instant of closure.

Therefore, the principal object of this invention is to provide a filter assembly which will permit clean, filtered fluid flow at the instant immediately prior to closure and which will permit unrestricted fluid flow (including particles) when the valve is in an open position.

This object, and still other and related ones of this invention, will become readily apparent after a consideration of the description of the invention and reference to the drawings.

DESCRIPTION OF THE PREFERRED EMBODIMENT

Figure 1:
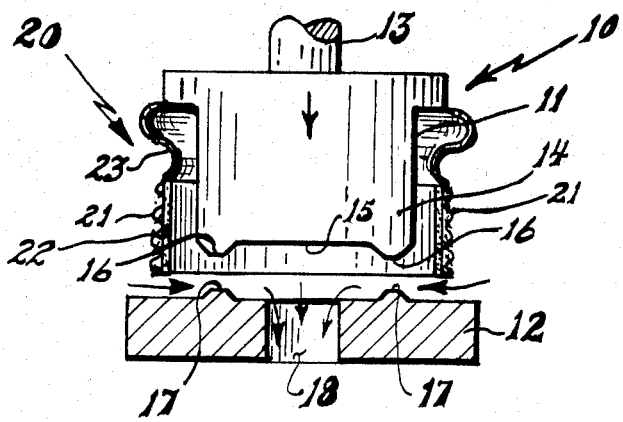
FIG. 1 is a side elevation view, partially in cross-section and in schematic form, of a typical poppet-type valve assembly, with the valve in an open position, to which is attached a preferred embodiment of the invention.
Figure 2:
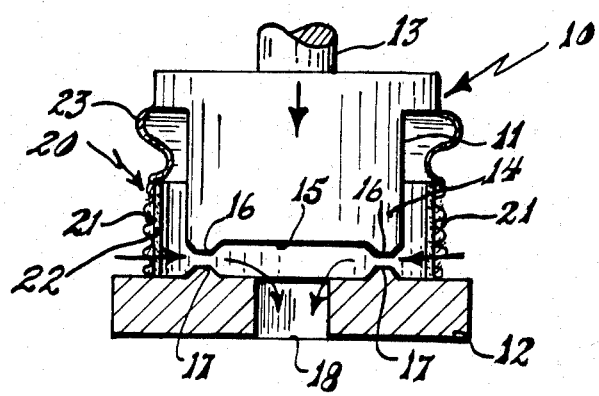
FIG. 2 is also a side elevation view, partially in cross-section and in schematic form, of a typical poppet-type valve assembly, with the valve in an intermediate position, to which is attached the preferred embodiment of the invention.
Figure 3:
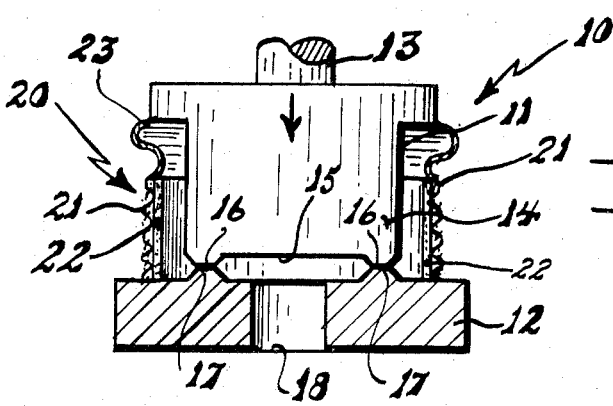
FIG. 3 is also a side elevation view, partially in cross-section and in schematic form, of a typical poppet-type valve assembly, with the valve in a closed position, to which is attached the preferred embodiment of the invention.

FIGS. 1-3 inclusive, wherein the same component has the same reference numeral, show a poppet-type valve in various positions and the relative position of the preferred embodiment during each of the valve positions.

The poppet-type valve assembly 10, shown in FIGS. 1, 2 and 3, includes but is not limited to, poppet-type metal valve 11 and metal valve seat 12. Valve 11 has a stem 13 and a valve head 14 which, in turn, has a round face 15 with a raised circular closing element or sealing surface 16 in the form of a land. Seat 12 has a raised circular closing element or sealing surface 17 in the form of a land and an aperture or outlet 18.

The fluid flow into and through outlet 18 is as indicated by the arrows in FIGS. 1 and 2.

The direction of travel of the valve is as shown by the arrow, in FIGS. 1-3 inclusive, on the valve 11.

With reference to FIGS. 1-3 inclusive, therein is shown preferred embodiment 20 which is a filter assembly. Filter assembly 20 includes filter holder 21 which acts as a filter support, filter 22, and means 23 for attaching filter holder 21, with filter 22 within and attached thereto, to valve 11. Filter holder 21 is perforated to permit the flow of the fluid and, in the form for use with the poppet-type valve assembly 10, shown in FIGS. 1-3, is a cylinder or ring. Filter holder 21 surrounds the periphery of valve head 14 of valve 11. Filter 22 is of a porosity to permit the flow of the fluid in the system, but to entrap the particles entrained in the fluid, and for use in the valve assembly 10, shown in FIGS. 1-3, is cylindrical. The means for attaching the combination of the filter 22 and the filter-holder 21 to the valve 11 portion of valve assembly 10 may be, as it is with regard to the present adaptation, a bellows 23 which is cylindrical and open-ended, with one end, i.e. the bottom end, attached to filter holder 21 and with the other end, i.e. the top end, surrounding and attached to the periphery of valve head 14. Filter 22, filter holder 21, and bellows 23 are made of material which is suitable for use in the environment intended, and they are so positioned and so dimensioned that when valve 11 is in the open position, such as shown in FIG. 1, there is unrestricted fluid flow and at the instant immediately prior to valve closure, such as shown in FIG. 2, there is clean, filtered fluid flow. At closure, such as shown in FIG. 3, there is no flow into outlet 18 of valve seat 12.

MODE OF OPERATION OF THE PREFERRED EMBODIMENT

When valve 11 is in an open position, as shown in FIG. 1, the particle entrained fluid flows between valve 11 (and filter assembly 20) and seat 12 and enters into and passes through outlet 18. The fluid flow is particle-entrained and unrestricted.

As valve 11 moves downwardly, as indicated by the arrow on the valve, it reaches an intermediate point, such as shown in FIG. 2, where immediately prior to closure the bottom surfaces of filter holder 21 and filter 22 touch and mate with the top surface of seat 12, in a manner that excludes any gaps between filter assembly 20 and seat 12 and therefore prevents particles from passing between these mating surfaces. There results a flow of clean, i.e. particle-eliminated, fluid, since the particles in the fluid are trapped by filter 22. The fluid flow at this point is clean and filtered.

This clean, filtered fluid flow continues until the metal sealing elements 16 and 17, respectively, of valve head 14 and of seat 12 make contact and shut off the flow of fluid to outlet 18, as shown in FIG. 3. In this regard, it is to be noted that when valve 11 moves downwardly to shut off the fluid flow, bellows 23 contracts to a compressed position. Conversely, when valve 11 moves upwardly thereafter, bellows 23 extends to an expanded position.

Since, from the time of the position of valve 11 as shown in FIG. 2 to the time of closure as shown in FIG. 3, there has been a clean, filtered flow of fluid for a sufficient period, there are no particles which can become entrapped between sealing elements 16 and 17 and which thereby would keep valve 11 open and cause leakage.

While there have been shown and described the fundamental features of the invention, as applied to a preferred embodiment, it is to be understood that various substitutions and omissions may be made by those of ordinary skill in the art without departing from the spirit of the invention.

What is claimed is:

1. A filter assembly, in a particle-entrained fluid flow system, for clean sealing a poppet-type valve assembly having a valve component with a valve head, comprising:
   a. a cylinder shaped filter holder which is perforated and which surrounds the periphery of the valve head;
   b. a filter attached to said filter holder;
   c. and, a bellows which is cylindrical and is open-ended, with one end attached to said filter holder and with the other end surrounding and attached to the periphery of the valve head;
   with said filter, said filter holder, and said bellows, positioned and dimensioned so that, when the valve is in the open position, there is unrestricted flow of the flow of the particle-entrained fluid, and at the instant immediately prior to valve closure there is clean, particle-free, filtered flow.

* * * * *